United States Patent
Kataoka et al.

(10) Patent No.: US 6,930,786 B2
(45) Date of Patent: Aug. 16, 2005

(54) IMAGE FORMING APPARATUS

(75) Inventors: Tatsuhito Kataoka, Numazu (JP); Hirokazu Kodama, Shizuoka-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 1003 days.

(21) Appl. No.: 09/726,463

(22) Filed: Nov. 29, 2000

(65) Prior Publication Data

US 2001/0005266 A1 Jun. 28, 2001

(30) Foreign Application Priority Data

Dec. 2, 1999 (JP) ............................................. 11-342691
Nov. 28, 2000 (JP) ........................................ 2000-360830

(51) Int. Cl.[7] .............................................. G06F 15/00
(52) U.S. Cl. ........................ 358/1.12; 399/299; 399/300
(58) Field of Search ........................... 358/1.1, 1.3, 1.4, 358/1.7, 1.8, 1.12; 399/299, 300, 301, 394, 396

(56) References Cited

U.S. PATENT DOCUMENTS 5,241,400 A * 8/1993 Itagaki ........................ 358/401
6,236,827 B1 * 5/2001 Hada ........................... 399/301

* cited by examiner

Primary Examiner—Mark Wallerson

(74) Attorney, Agent, or Firm—Cowan, Liebowitz & Latman, P.C.

(57) ABSTRACT

An image forming apparatus includes a plurality of image forming stations each having an image carrier and forming an image on the image carrier; a mark detecting unit for detecting a plurality of registration correction marks formed on a recording medium by the plurality of image forming stations; a correction mechanism for correcting a position difference between images formed by the plurality of image forming stations in accordance with a detection result by the mark detecting unit; and a controller for independently controlling an image forming operation of each of the plurality of the image forming stations so that the image density of each of the registration correction marks formed by the plurality of image forming units has a different predetermined image density.

20 Claims, 14 Drawing Sheets

ENLARGEMENT OF PORTION *

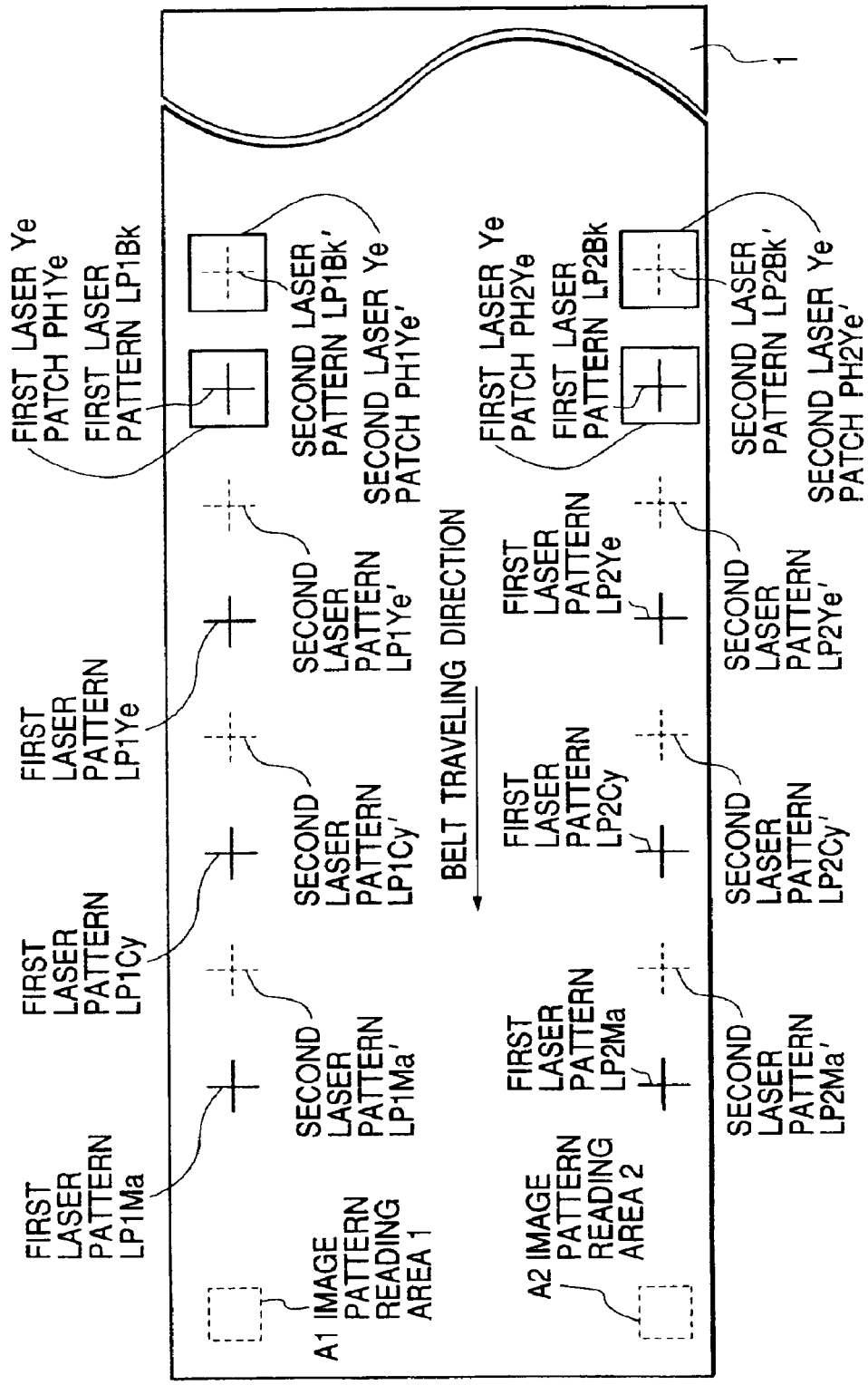

FIG. 13
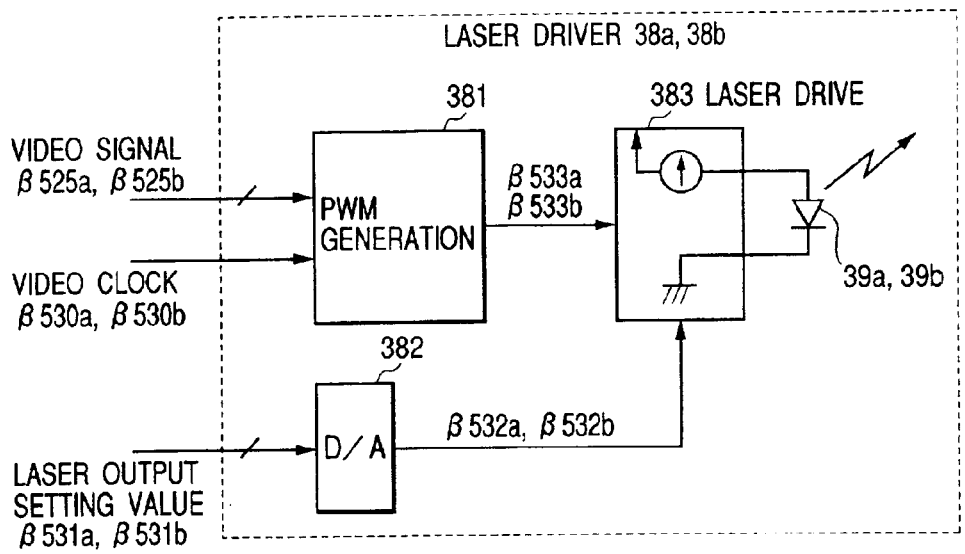
FIG. 14A
REFERENCE TRIANGULAR WAVE
VIDEO DATA FOR COMPARISON
FIG. 14B
PWM OUTPUT
β 533a
β 533b
FIG. 14C
60 TO 80mA
LASER DRIVE CURRENT

FIG. 15

STORAGE MEDIUM SUCH AS FD, CD-ROM OR THE LIKE

| DIRECTORY INFORMATION |
|---|
| FIRST DATA PROCESSING PROGRAM<br>PROGRAM CODE GROUPS CORRESPONDING TO STEPS OF FLOWCHART SHOWN IN FIG. 11 |
| |

IMAGE FORMING APPARATUS

BACKGROUND OF THE INVENTION

1. Field of the Invention

The present invention relates to an image forming apparatus, and more particularly to techniques for correcting position difference among a plurality of images.

2. Related Background Art

A color image forming apparatus is known which has a plurality of record units each applying a laser beam modulated by record data to a photosensitive drum, developing an electrostatic latent image on a photosensitive member by an electronic photographing process and transferring the image to a transfer sheet to form a color image by sequentially transporting the transfer sheet by a transfer belt to each record unit and superposing each color image on the transfer sheet.

With the color image forming apparatus of this type, each electrostatic latent image on each photosensitive drum is developed and transferred to a transfer sheet on a transfer belt. In this case, registration of each color image is shifted if there is a mechanical mount error of each photosensitive drum, or an optical path length error or an optical path change of each laser beam.

In order to solve this problem, so-called registration correction techniques have been proposed. According to the techniques, a registration correction pattern image formed on a transfer belt is read with a CCD sensor or the like to detect a registration shift of each color photosensitive drum. In accordance with this registration shift, electrical correction of image signals to be recorded is performed and mechanical correction of the optical path length or optical path is performed by driving each reflection mirror disposed in the intermediate optical path of each laser beam.

The image forming apparatus of this type is, however, associated with some problem in registration correction that the read level of each registration correction pattern may become different and hence the detection level of each registration correction pattern may become different. This problem results from a different image density of each registration correction pattern recorded by the record unit, i.e., a different composition of coloring transfer material and the like.

If electrical correction of image signals to be recorded is performed and mechanical correction of the optical path length or optical path is performed by driving each reflection mirror disposed in the intermediate optical path of each laser beam, in accordance with the registration shift amount obtained by detecting each registration correction mark recorded by the record unit, then high precision adjustment is difficult because the detected registration shift amount itself may contain some error.

SUMMARY OF THE INVENTION

It is an object of the invention to solve the above-described problem.

It is another object of the invention to provide high precision registration correction.

In order to achieve the above object, according to one aspect of the present invention, there is provided an image forming apparatus comprising: a plurality of image forming means each having an image carrier and forming an image on the image carrier; mark detecting means for detecting a plurality of registration correction marks formed on a recording medium by the plurality of the image forming means; correcting means for correcting a position difference between images formed by the plurality of the image forming means in accordance with a detection result by the mark detecting means; and controlling means for independently controlling an image forming operation of each of the plurality of the image forming means so that an image density of each of the registration correction marks formed by the plurality of the image forming means has a different predetermined image density.

Other objects and features of the present invention will become apparent from the following detailed description of embodiments when read in conjunction with the accompanying drawings.

BRIEF DESCRIPTION OF THE DRAWINGS

FIG. 4 is a schematic diagram showing pattern images formed on a transfer belt in response to each enable signal shown in FIGS. 3A and 3B.

FIG. 13 is a diagram showing the main structure of a laser driver shown in FIG. 12.

FIGS. 14A, 14B and 14C are timing charts showing the operation timings of a circuit shown in FIG. 13.

FIG. 15 is a memory map of a storage medium for storing various data processing programs which can be read by the image forming apparatus of this invention.,

DETAILED DESCRIPTION OF THE PREFERRED EMBODIMENTS

Embodiments of the invention will be described.

Figure 1:
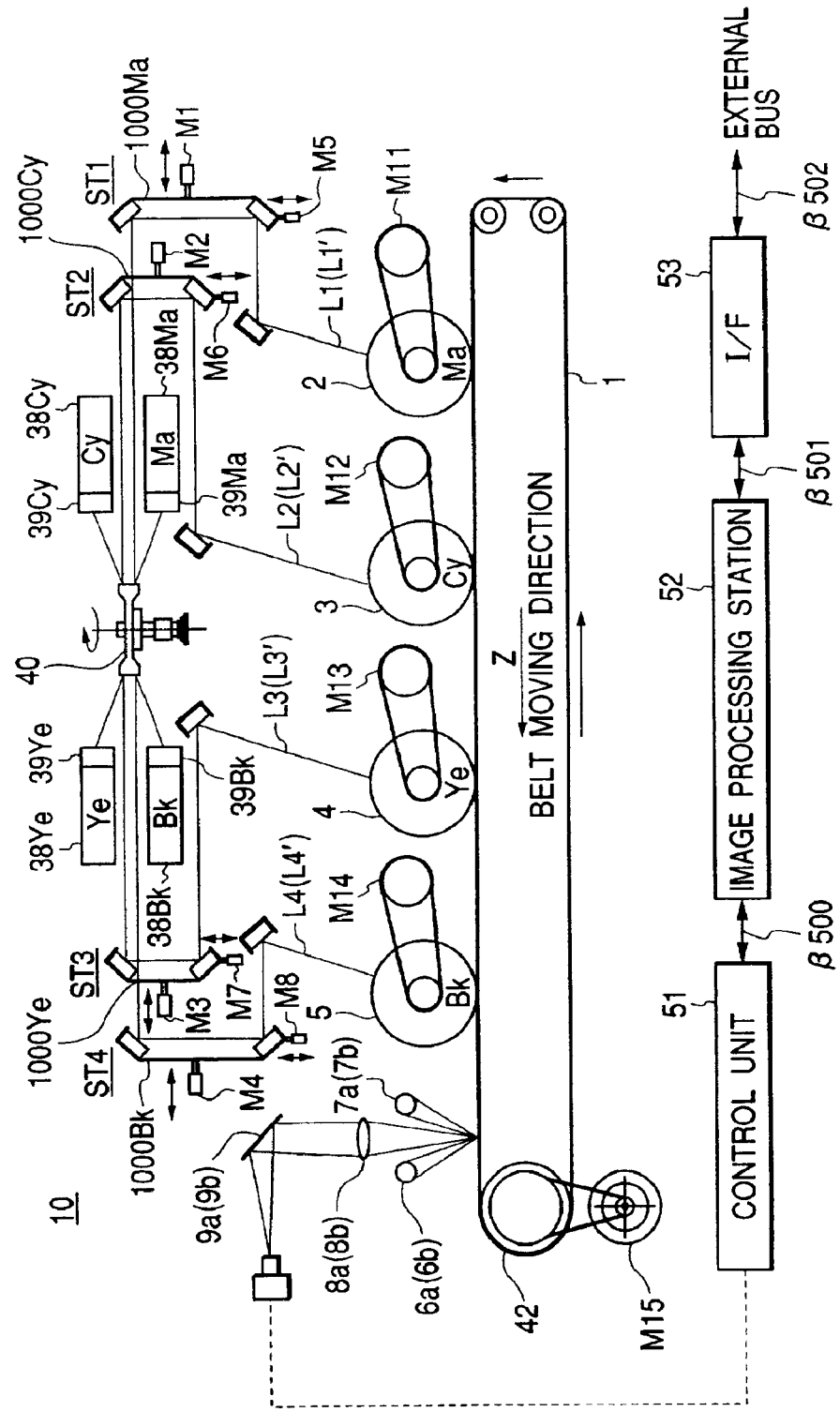
FIG. 1 is a schematic diagram showing the structure of an image forming apparatus according to an embodiment of the invention.

FIG. 1 is a schematic diagram showing the structure of an image forming apparatus according to an embodiment of the invention.

Referring to FIG. 1, a transfer belt 1 is moved in the direction indicated by an arrow Z shown in the central area in FIG. 1, as a pulse motor M15 is driven and its rotation force is transmitted to a drive roller 42. Reference numerals 2 to 5 represent magenta (Ma), cyan (Cy), yellow (Ye) and black (Bk) photosensitive drums, respectively disposed in this order. Semiconductor lasers 39Ma, 39Cy, 39Ye and 39Bk of respective colors are driven by laser drivers 38Ma, 38Cy, 38Ye and 38Bk and emit laser beams L1 and L1'; L2 and L2'; L3 and L3'; and L4 and L4' to scan the photosensitive drums 2 to 5 and form electrostatic latent images on the photosensitive drums 2 to 5. Drum motors M11 to M14 rotate the photosensitive drums 2 to 5 by predetermined rotation amounts.

Image stations ST1 to ST4 for magenta (Ma), cyan (Cy), yellow (Ye) and black (Bk) colors respectively disposed in this order mechanically correct a shift of the magnification factor and inclination of registration by using reflection mirrors 1000Ma, 1000Cy, 1000Ye and 1000Bk which are driven by pulse motors M1 to M8.

A reader unit 10 includes illumination lamps 6a and 6b, illumination lamps 7a and 7b, converging lenses 8a and 8b, reflection mirrors 9a and 9b, CCD sensors 10a and 10b and the like. A pair of front and back patterns (e.g., cross marks having a predetermined width) formed on the transfer belt 1 moved by the pulse motor 15 is illuminated and its reflection light is focussed upon the CCD sensors 10a and 10b to read the patterns. In this embodiment, infrared emission lamps are used as the illumination lamps 6a and 6b; and 7a and 7b. This is because the reflection light amount of each color pattern is intended to be made as constant as possible in view of the fact that the reflection light amount of each color toner does not depend too much upon the coloring components of toner.

In accordance with pattern data read with the CCD sensors 10a and 10b, a control unit 51 collectively controls the formation of images, including predetermined data processing and mirror control for magnification and inclination adjustments, by communicating with an image processing station 52 via a CPU bus β500. The image processing station 52 executes the predetermined data processing and mirror control for magnification and inclination adjustments, and communicates with an interface (I/F) 53. The interface (I/F) 53 can communicate with the image processing station 52 via a bus β501 and with an external bus via a bus β502.

The operation of each constituent element will be described.

First, an image forming operation will be described.

The photosensitive drums 2 to 5 corresponding to magenta (Ma), cyan (Cy), yellow (Ye) and black (Bk) are rotated by the drum motors M11 to M14 and uniformly charged by a charge unit (not shown). The photosensitive drums 2 to 5 corresponding to magenta (Ma), cyan (Cy), yellow (Ye) and black (Bk) are exposed by the laser beams L1 and L1'; L2 and L2'; L3 and L3'; and L4 and L4' optically modulated with video signals to form electrostatic latent images which are developed by a developing unit (not shown) to form visible images.

The electrostatic latent images formed on the photosensitive drums 2 to 5 are transferred at predetermined timings to a transfer sheet fed from a paper feed unit (not shown) and electrostatically absorbed on the transfer belt 1. The transfer sheet is transported in the arrow direction by the pulse motor M15, fixed by a fixing unit and then ejected.

Next, an operation of reading a registration correction pattern image will be described.

Pattern images on the photosensitive drums 2 to 5 visualized by a registration correction pattern image forming circuit are transferred to the transfer belt 1 at timings shown in FIG. 3 to be described later, and transported in the arrow direction. The transported pattern images are sequentially read by the CCD sensors 10a and 10b with an optical system constituted of the illumination lamps 6a and 6b, illumination lamps 7a and 7b, converging lenses 8a and 8b, and reflection mirrors 9a and 9b.

In this embodiment, in order to realize a high speed apparatus, a two-beam laser scan method is incorporated as the laser optical system. This two-beam laser scanning will be described with reference to FIGS. 2A and 2B.

Figure 2A:
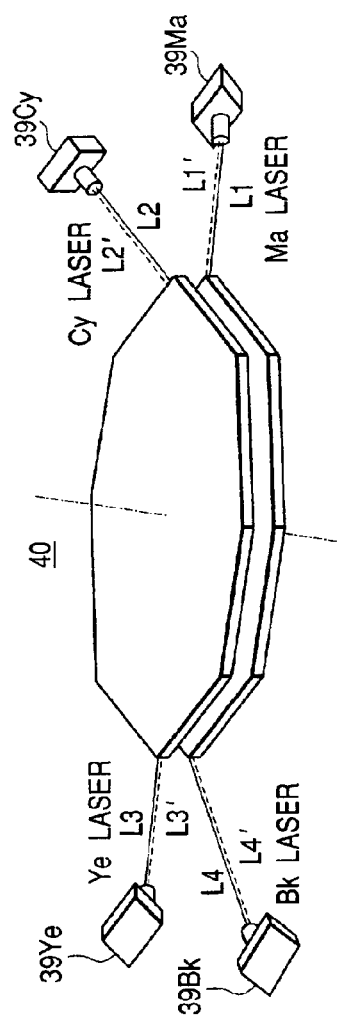
FIGS. 2A and 2B are diagrams showing the structure of a laser scan optical system of the image forming apparatus shown in FIG. 1.
Figure 2B:
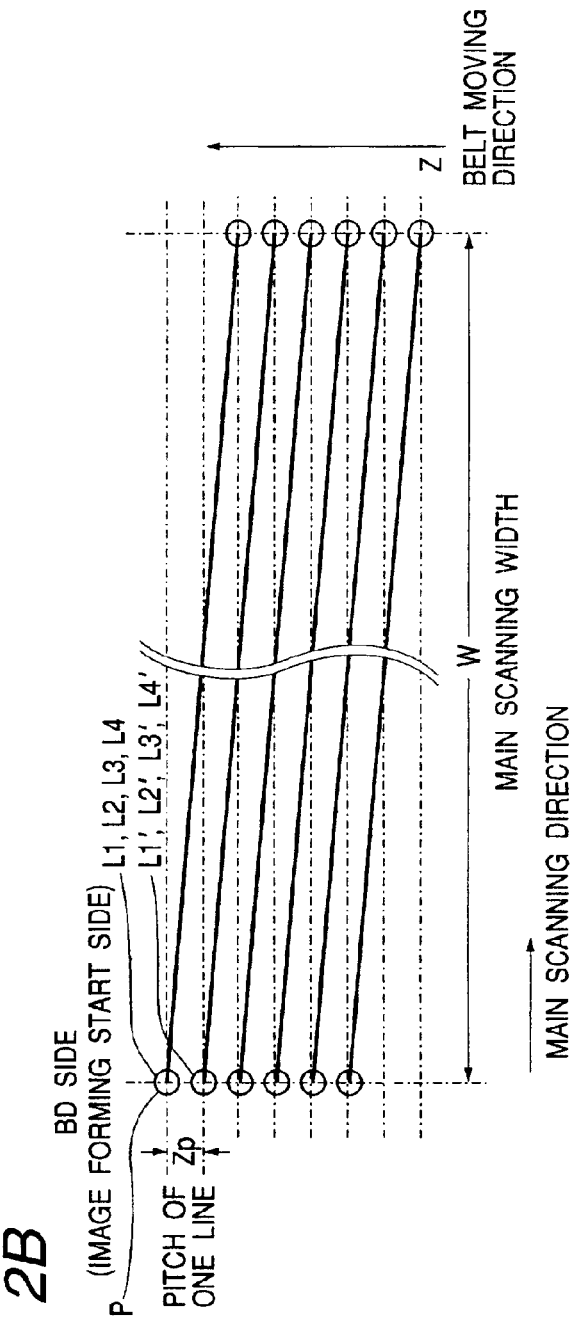

FIGS. 2A and 2B are schematic diagrams showing the structure of a laser scan optical system of the image forming apparatus shown in FIG. 1. FIG. 2A shows the structure of a polygon scanner 40 and semiconductor lasers 39Ma, 39Cy, 39Ye and 39Bk, and FIG. 2B is a schematic diagram showing a laser radiation state.

As shown in FIG. 2A, eight laser beams in total are radiated, including the laser beams L1 and L1'; L2 and L2'; L3 and L3'; and L4 and L4' corresponding to magenta (Ma), cyan (Cy), yellow (Ye) and black (Bk). A latent image of each color is formed on the photosensitive drum by using two laser beams of L1 and L1'; L2 and L2'; L3 and L3'; or L4 and L4'.

Referring to FIG. 2B, P (shown as a circle) represents a pixel formed by laser scanning, ZP represents a main scanning line pitch, and W represents a main scanning width. The laser beams L1(LM) and L1'(LM'); L2(LC) and L2'(LC'); L3(LY) and L3'(LY'); or L4(LBK) and L4'(LBK') are scanned at the main scanning line pitch ZP. The motion direction of the transfer belt 1 is indicated by an arrow Z. With such a two-beam laser scan method, even if the transport speed of a transfer member (traveling speed of a belt) is set to a high speed, the time taken to form an image on the transfer member or belt is halved. Therefore, restrictions on the rotation of a polygon scanner, the laser drive frequency and the like can be reduced considerably.

For example, in an image forming apparatus having an image forming performance of 30 images per one minute, if the two-beam laser scan method is adopted, the image forming performance is doubled to 60 images per one minute without modifying the apparatus.

A pattern forming means of this invention corresponds to a means for reading predetermined registration correction pattern data stored in an unrepresented ROM, forming pattern latent image pairs on the photosensitive drums 2 to 5 at predetermined positions different in the axial direction by scanning each pair of the laser beams LM and LM'; LC and LC'; LY and LY'; and LBK and LBK', developing the latent image pairs with color toners of magenta (Ma), cyan (Cy), yellow (Ye) and black (Bk), and transferring the image pairs to the transfer belt 1. In this embodiment, a pair of pattern images is formed at predetermined positions in the width direction perpendicular to the transport direction of the transfer belt 1.

The reader unit 10 includes the illumination lamps 6a and 6b, illumination lamps 7a and 7b, converging lenses 8a and 8b, reflection mirrors 9a and 9b, CCD sensors 10a and 10b and the like. A pair of patterns (e.g., cross marks having a predetermined width) formed on the transfer belt 1 moved by the pulse motor 15 is illuminated and its reflection light is focussed upon the CCD sensors 10a and 10b to read the patterns.

In this embodiment, infrared emission lamps are used as the illumination lamps 6a and 6b; and 7a and 7b. This is because the reflection light amount of each color pattern is intended to be made as constant as possible in view of the fact that the reflection light amount of each color toner does not depend too much upon the coloring components of toner.

In accordance with pattern data read with the CCD sensors 10a and 10b, the control unit 51 collectively controls the formation of images, including predetermined data processing and mirror control for magnification and inclination adjustments, by communicating with the image processing station 52 in which a CPU 52c (in FIG. 5 to be described later) executes a control program stored in a ROM or the like.

In the image forming apparatus constructed as above, a video controller 52a (in FIG. 5 to be described later) of the image processing station 52 controls in such a manner that when each image forming means forms a registration correction pattern on a transport member (transfer belt 1) at a predetermined timing, the reader unit 10 starts reading the registration correction mark transferred to the transport member (transfer belt 1). A registration controller 20 (in FIG. 6 to be described later) of the control unit 51 executes a predetermined calculation of the read data, and stores the calculated results of each color in RAMs 603 and 604 (in FIG. 8 to be described later) of the registration controller 20. CPU 52c (in FIG. 5 to be described later) of the image processing station 20 analyzes the stored calculation results to mechanically or electrically correct each image station (ST1 to ST4).

In this embodiment, registration of each drum is made coincident as in the following. A shift of the magnification and inclination of registration is mechanically corrected by moving the reflection mirrors 1000Ma, 1000Cy, 1000Ye and 1000Bk of the optical scan system (provided for each drum) by the pulse motors M1 to M8, and a beam scan timing is electrically corrected by a video memory controller 52d which controls the timing of reading image data from a video memory 52b.

Figure 3A:
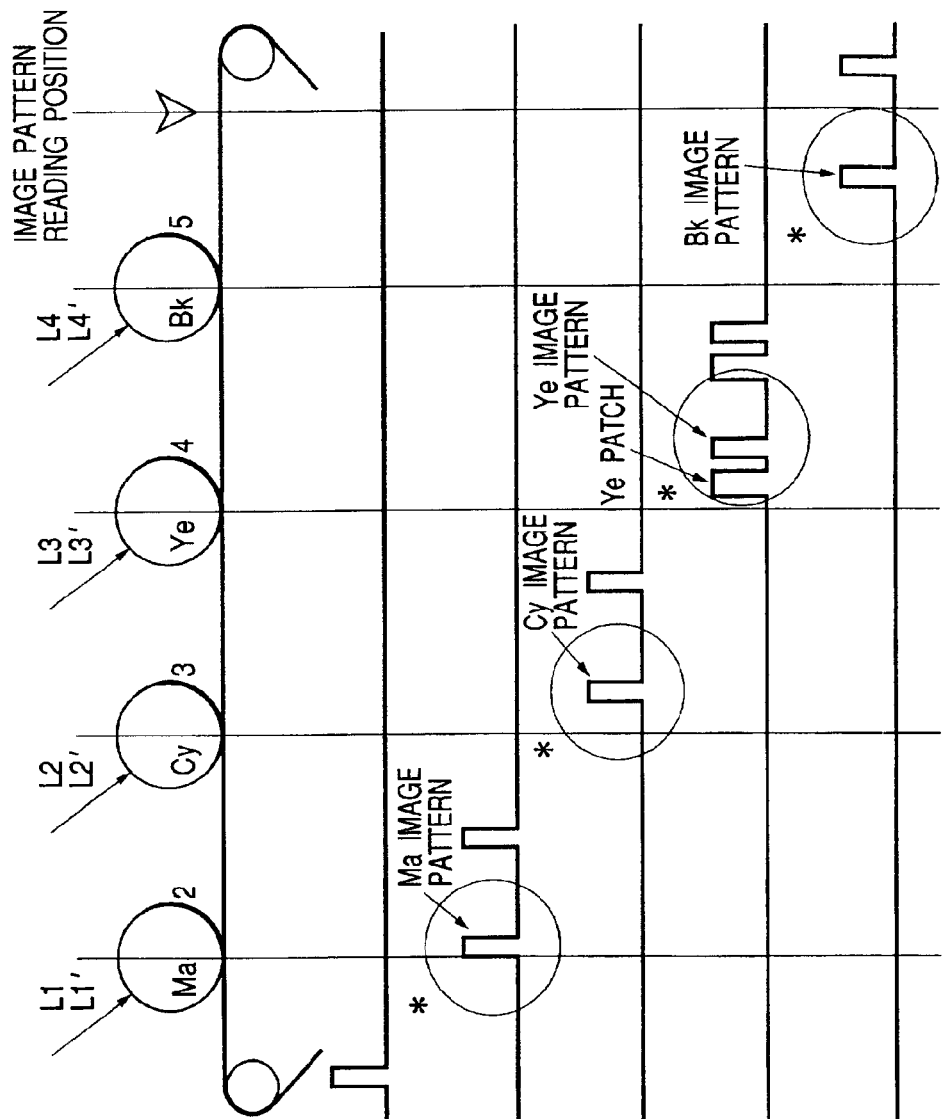
FIGS. 3A and 3B are timing charts showing pattern image write timings of the image forming apparatus shown in FIG. 1.
Figure 3B:
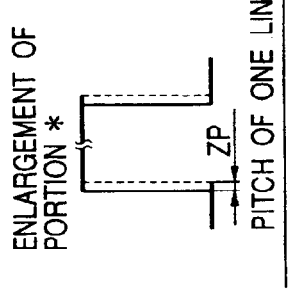

FIGS. 3A and 3B are timing charts showing pattern image write timings of the image forming apparatus shown in FIG. 1. FIG. 3A is a timing chart showing pattern image write timings of respective colors, and FIG. 3B is an enlarged view showing the waveform of enable signals.

In FIGS. 3A and 3B, since the two-beam laser scan method is used as described earlier, two enable signals for registration correction patterns of each color are output as shown in the enlarged view of FIG. 3B showing an area indicated by *. Two enable signals each having the same pulse width and space ZP of one line, such as the signals S2 and S2'; S3 and S3'; S4 and S4'; and S5 and S5', can be output. By using eight enable signals of four colors×2 beams, registration correction pattern images of respective colors are formed. Similar enable signals are also generated for a usual image forming operation. The Ye laser enable signals S4 and S4' are Ye patch drawing enable signals for Bk pattern images.

By using such enable signals, pattern images such as shown in FIG. 4 are formed.

FIG. 4 is a schematic diagram showing pattern images formed on the transfer belt 1 by using the enable signals shown in FIGS. 3A and 3B.

In FIG. 4, A1 represents a first pattern image read area. First laser patterns LP1Ma, LP1Cy, LP1Ye and LP1Bk and second laser patterns LP1Ma', LP1Cy', LP1Ye' and LP1Bk' formed on the transfer belt 1 are read with the CCD sensor 10a shown in FIG. 1 when they pass through the first pattern image read area A1. A2 represents a second pattern image read area. First laser patterns LP2Ma, LP2Cy, LP2Ye and LP2Bk and second laser patterns LP2Ma', LP2Cy', LP2Ye' and LP2Bk' formed on the transfer belt 1 are read with the CCD sensor 10b shown in FIG. 1 when they pass through the second pattern image read area A2.

First laser patch enable signals PH1Ye and PH2Ye and second laser patch enable signals PH1Ye' and PH2Ye' are Ye patch enable signals for first laser patterns LP1Bk and LP2Bk and second laser patterns LP1Bk' and LP2Bk'.

Figure 5:
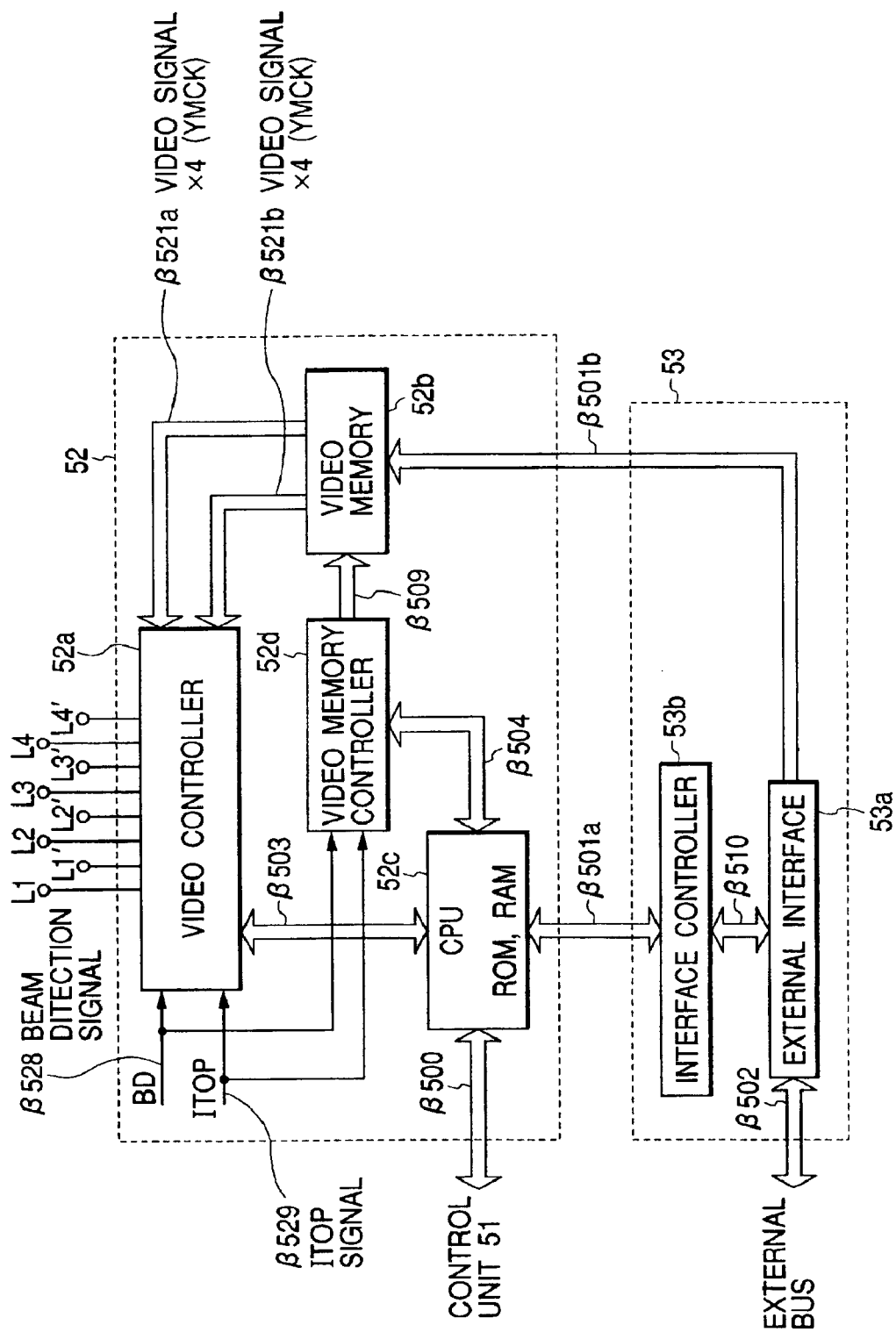
FIG. 5 is a block diagram showing the structure of an image processing station and interface shown in FIG. 1.

With reference to FIG. 5, the structures of the image processing station 52 and interface (I/F) 53 shown in FIG. 1 will be described. The image processing station 52 and interface 53 constitute a circuit for driving laser beams in accordance with input image data and forming images.

FIG. 5 is a block diagram showing the structures of the image processing station 52 and interface (I/F) 53 shown in FIG. 1. Similar constituent elements to those shown in FIG. 1 are represented by using identical reference numerals.

The video controller 52a of the image processing station 52 transmits the registration correction patterns and video signals for usual image data read from the video memory 52b via busses β521a to each laser driver, synchronously with a BD signal β528 and an ITOP signal β529. The video memory 52b stores therein registration correction pattern data and image data such as conventional image data. The video memory controller 52d controls the image data read timing from the video memory 52b by using a control signal β509 to thereby electrically correct the scan timing of each laser beam.

CPU 52c has inner RAM, ROM and the like. CPU 52c executes the control program stored in ROM to perform predetermined data processing and mirror control for magnification and inclination adjustments. Therefore, the optical path length and optical path of each laser beam are mechanically corrected and the scan timing of each laser beam is electrically corrected to make the registration of each drum be coincident. CPU 52c also controls the control unit 51, video controller 52a, video memory controller 52d and interface 53, respectively via buses β500, β503, β504 and β501a.

An interface controller 53b of the interface (I/F) 53 controls an external interface 53a via a bus β510. The external interface 53a can transmit the data externally received via the bus β502 directly to the video memory 52b via a data bus β501b.

The operation of each constituent element will be described.

As shown in FIG. 5, video signals for forming an image are supplied via the external bus β502 (for an external interface, a general interface such as the general purpose interface bus (GPIB) may be used) to the external interface 53a and stored in the video memory 52b of the image processing station 52 via the bus β501b.

In this case, CPU 52c activates the interface controller 53b via the CPU interface bus β501a to control the operation of the external interface 53a via a control bus β510.

The video memory controller 52d executes the address control and read/write control of the video memory 52b to read/write video data and form an image.

In this case, the video memory controller 52d is controlled by CPU 52c via the control bus β504. The video memory 52b sends the video data to the video controller 52a so that the PWM modulated laser beams L1 and L1'; L2 and L2'; L3 and L3'; and L4 and L4'; described earlier are generated and latent images are formed on the photosensitive drums.

CPU 52c is connected to the control unit 51 via the CPU bus β500 to receive registration shift data and supply electrical and mechanical registration correction target data to the control unit 51. In this manner, CPU 52c collectively controls the registration correction of this invention.

Figure 6:
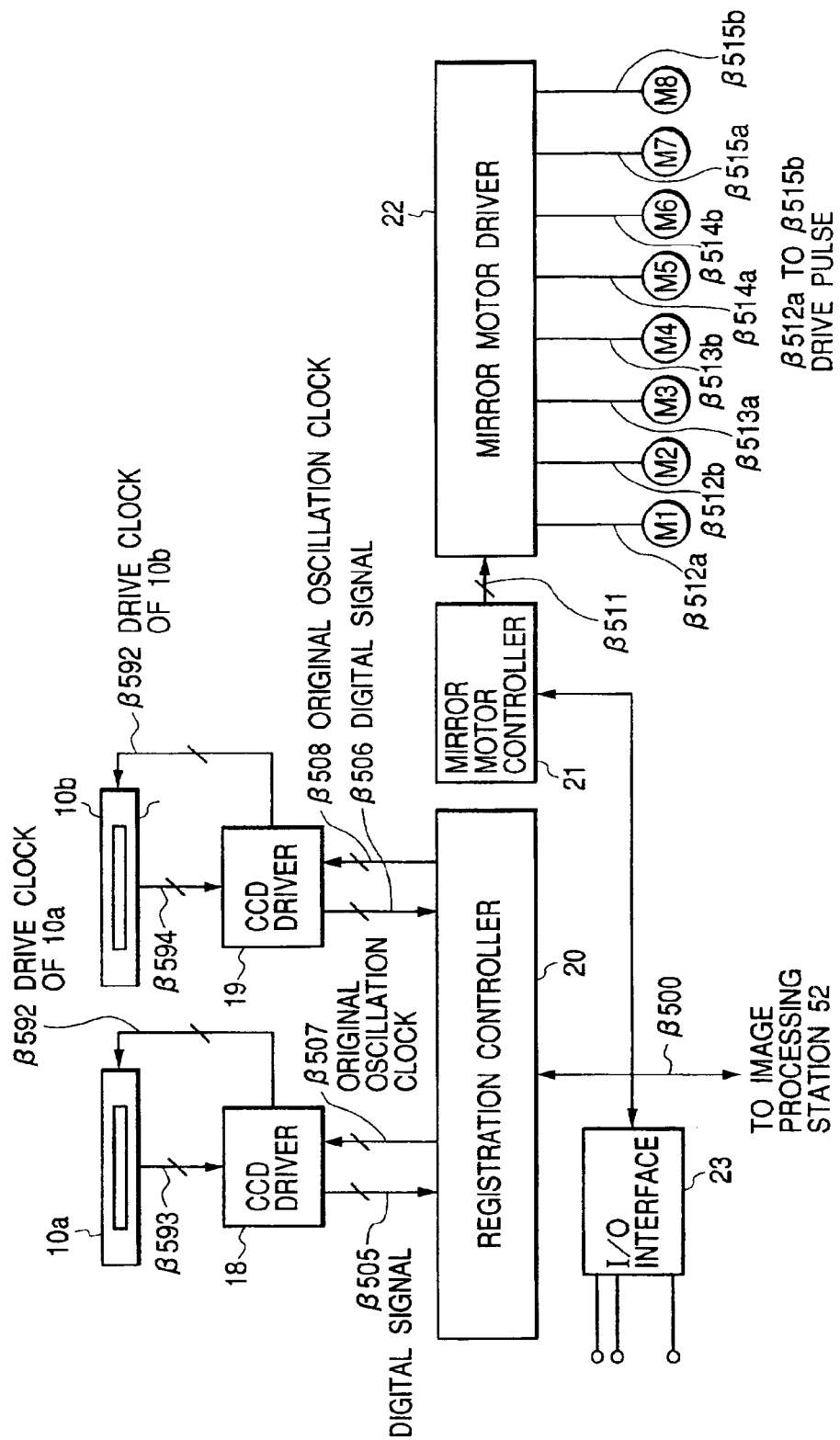
FIG. 6 is a diagram showing a control unit shown in FIG. 1.

FIG. 6 is a block diagram showing the structure of the control unit 51 shown in FIG. 1. Similar constituent elements to those shown in FIG. 1 are represented by using identical reference numerals.

In FIG. 6, CCD drivers 18 and 19 generate clocks (such as transfer pulse, reset pulse and shift pulse) β591 and β592 necessary for driving the CCD sensors 10a and 10b in accordance with original oscillation clocks β507 and β508 supplied from a registration controller 20, and supplies them to the CCD sensors 10a and 10b.

The CCD drivers 18 and 19 execute processes such as amplification and A/D conversion of pattern image signals β593 and β594 read by the CCD sensors 10a and 10b, and supply the digital pattern image signals β505 and β506 to the registration controller 20.

The registration controller 20 executes a registration correction pattern recognition process for the digital image signals β505 and β506 supplied from the CCD drivers 18 and 19, stores a plurality of pattern recognition data sets in a memory (not shown). These data sets are sent to CPU 52c of the image processing station 52 via the CPU bus β500. CPU 52c calculates a position difference of each color pattern, and in accordance with the calculation results, the write timings of the main and sub-scanning are controlled.

A mirror motor controller 21 sets a pulse motor drive pulse value (motor drive control signal) β511 to a mirror motor driver 22 in accordance with the drive pulse data supplied from CPU 52c. The mirror motor driver 22 drives each motor in accordance with each set of drive pulses β512a to β515a, and β512b to β515b corresponding to the pulse motor drive values. In this manner, the positioning control for the reflection mirrors 1000Ma, 1000Cy, 1000Ye and 1000Bk is performed to correct the optical path length and optical path of each laser beam and correct a shift of the magnification and inclination of registration of each color.

The operation of each constituent element will be described.

The CCD sensors 10a and 10b read the pattern images of respective colors formed as shown in FIG. 4 on the front and back sides relative to the transport direction of the transfer belt 1 shown in FIG. 1. The original oscillation clocks β507 and β508 are supplied from the registration controller 20 to the CCD drivers 18 and 19, and the generated clocks (transfer pulse, reset pulse, shift pulse and the like) β591 and β592 necessary for driving the CCD sensors 10a and 10b are supplied to the CCD sensors 10a and 10b.

The pattern image signals read by the CCD sensors 10a and 10b are subjected to processes such as amplification and A/D conversion by the CCD drivers 18 and 19. The converted digital pattern image signals β505 and β506 are supplied to the registration controller 20.

The pattern image signals of respective colors received by the registration controller 20 are subjected to the registration correction pattern recognition process. A plurality of pattern recognition data sets are stored in a temporary memory and then supplied to CPU 52c via the CPU bus β500. By using the position of a pattern image of a predetermined color as a reference, CPU 52a calculates a position shift of the pattern image of each of the other colors. In accordance with this calculation results, the video controller 52a controls the memory read timing of the registration correction pattern image and the video memory controller 52d controls the memory read timing of a conventional image, to thereby correct the color shift of each color.

In order to correct the optical path length and optical path of each laser beam and correct the magnification and inclination of registration of each color, CPU 52c sends the drive pulse data to the mirror motor controller 21 to control the inclination correction pulse motors M5 to M8 and magnification correction pulse motors M1 to M4, which motors drive the reflection mirrors 1000Ma, 1000Cy, 1000Ye and 1000Bk disposed in the optical path. In accordance with this drive pulse data, the mirror motor controller 21 sets the pulse motor drive pulse signal β511 to the mirror motor driver 22 to drive the motors by the drive pulses β512a to β515a, and β512b to β515b. In this manner, the positioning control for the reflection mirrors 1000Ma, 1000Cy, 1000Ye and 1000Bk is performed.

Figure 7:
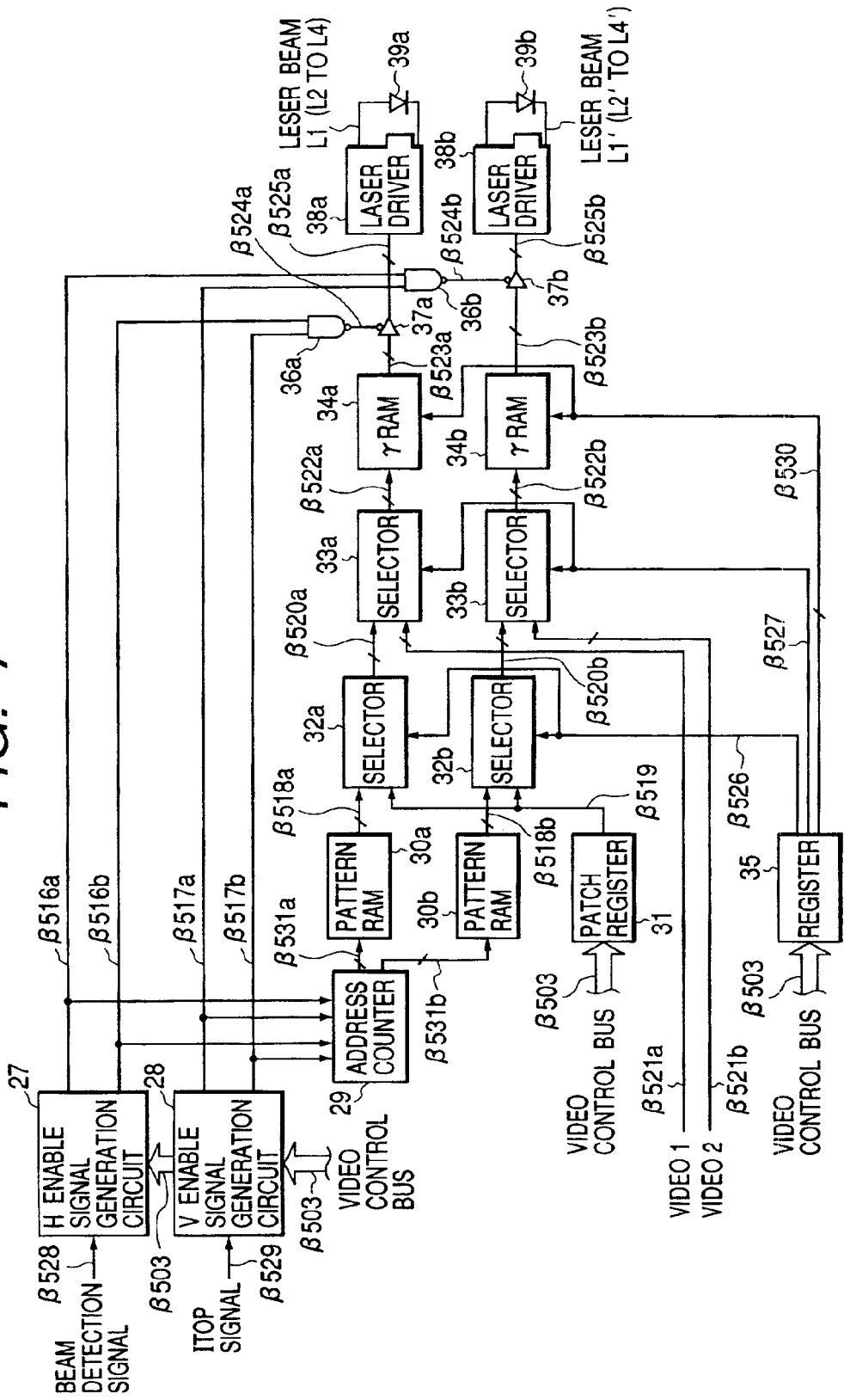
FIG. 7 is a diagram showing the main structure of a video controller in the image processing station shown in FIG. 1.

FIG. 7 is a circuit block diagram showing the main structure of the video controller 52a of the image processing station 52 shown in FIG. 1.

In FIG. 7, an enable signal generation circuit (H enable signal generation circuit) 27 generates H enable signals β516a and β516b for two laser beams for the registration correction pattern image signals, in response to a beam detect signal (BD) β528 which is a sync signal for the main scanning signal obtained when the laser beam scans an area outside of a record area, and supplies the H enable signals to NAND gates 36a and 36b. In this case, one of the detection signals of the two beams or a synthesized signal of the detection signals of the two beams is used as BD β528.

An enable signal generation circuit (V enable signal generation circuit) 28 for the sub-scanning direction generates independently V enable signals β517a and β517b for two laser beams for the registration correction pattern image signals of each color, in response to an input activation signal (ITOP) β529 to be used for registration correction pattern images, and supplies the V enable signals to NAND gates 36b and 36a.

In accordance with the V enable signals β517a and β517b supplied from the V enable signal generation circuit 28, an address counter 29 generates address signals β531a and β531b of pattern RAMs 30a and 30b for the next registration correction images. In accordance with these address signals, pattern images β518a and β518b (in this embodiment, cross patterns) are read from the pattern RAMs 30a and 30b. A patch register 31 stores patch data input via the video controller bus β503 (and formed in accordance with the registration correction pattern images).

Under control of CPU 52c, a register 35 outputs a selection signal β526 supplied from the video controller bus β503 to selectors 32a and 32b. The selection signal β526 is used for selecting either the pattern image signal β518a read from the pattern RAM 30a or the patch data (patch register signal) 519 read from the patch register 31, and for selecting either the pattern image signal β518b read from the pattern RAM 30b or the patch data 519.

Under control of CPU 52c, a register 35 outputs a selection signal β527 to selectors 33a and 33b. The selection signal β527 is used for selecting either the image signal β520a selected by the selector 32a or an image signal (video signal) β521a input from a first video line, and for selecting either the pattern image signal β520b selected by the selector 32b or an image signal (video signal) β521b input from a second video line.

γγRAMs 34a and 34b receive the image signals β522a and β522b selected by the selectors 33a and 33b, and output γ-transformed image data β523a and β523b to the laser drivers 38a and 38b via gate circuits 37a and 37b as video signals β525a and β525b. Namely, the image density can be changed by rewriting tables in γRAMS 34a and 34b. Gate signals β524a and β524b are supplied to the gate circuits 37a and 37b via NAND gates 36a and 36b.

In accordance with the input video signals β525a and β525b, the laser drivers 38a and 38b turn on and off the semiconductor lasers 39a and 39b to form latent images on the photosensitive drums 2 to 5 by using the optical scan system including the polygon scanner and reflection mirrors.

In this embodiment, as described above, the laser drivers of the two-beam laser scan structure are used. Therefore, two systems for forming pattern image data and patch data are used to drive the semiconductor lasers.

In this embodiment, the video controller 52a is constituted of four sets of the circuit shown in FIG. 7 respectively of magenta (Ma), cyan (Cy), yellow (Ye) and black (Bk) to form an image of each color. The image density of each of the four colors, magenta (Ma), cyan (Cy), yellow (Ye) and black (Bk), can therefore be adjusted independently.

The operation of the circuit for one of Ma, Cy, Ye and Bk will be described.

The beam detect signal (BD) β528, which is obtained when the laser beam scans the area outside of the record area and which is used as the sync signal for the main scanning signal, is supplied to the enable signal generation circuit (H enable signal generation circuit) 27 which in turn generates the H enable signals β516a and β516b for the two laser beams of the registration correction pattern image signals. In this case, one of the detection signals of the two beams or a synthesized signal of the detection signals of the two beams is used as BD β528. The input activation signal (ITOP) β529 for registration correction pattern images is supplied to the enable signal generation circuit (V enable signal generation circuit) 28 for the sub-scanning direction which in turn generates the V enable signals β517a and β517b for two laser beams of the registration correction pattern image signals of each color.

The H enable signals β516a and β516b and V enable signals β517a and β517b are supplied to the address counter 29 which in turn generates the address signals β531a and β531b of the pattern RAMs 30a and 30b for the next registration correction images. In accordance with these address signals, the pattern image signals β518a and β518b (in this embodiment, cross patterns) are read from the pattern RAMs 30a and 30b.

The patch register 31 stores patch data input via the video controller bus β503 and formed in accordance with the registration correction pattern images. This patch data signal β519 and pattern image signals β518a and β518b for the two laser beams are input to the selectors 32a and 32b. The select signal β526 is input to the selectors 32a and 32b so that the pattern image signals β518 are output for magenta (Ma), cyan (Cy), and black (Bk).

For the pattern image of yellow (Ye), under control of the select signal β526 supplied via the video controller bus β503, the signals β520a and β520b of switching between the pattern image data for the two laser beams and patch data are supplied to the selectors 33a and 33b at predetermined timings shown in the timing chart of FIGS. 3A and 3B. Video signals β521a and β521b are input to the selectors 33a and 33b.

If toner of a carbon black type is used as the black toner, the pattern image cannot be read because the reflection optical system using the carbon black absorbs light.

To solve this problem, at a predetermined time before one of the registration correction pattern images of color which reflects other colors (magenta, cyan and yellow) is formed (in this embodiment, yellow), a yellow solid pattern (patch) is formed on the transfer belt 1, and then the registration correction pattern image of black is formed on the yellow patch.

In this mode of forming the pattern images and patch, the select signal β527 is used for selecting the pattern images and patch. The selected pattern image data β522a and β522b are supplied to γRAMs 34a and 34b. The γ-transformed image data β523a and β523b are supplied to the laser drivers 38a and 38b via the gate circuits 37a and 37b as the video signals β525a and β525b. The γRAMs 34a and 34b have the γ-tables whose contents can be rewritten in response to an input of a γ setting signal (γ rewrite signal) β530 supplied from the register 35.

By utilizing this rewrite function, the contents of the γ-tables are partially rewritten so that the densities of the registration correction pattern images and patch can be changed in the registration correction mode. For example, if the pattern images and patch use 8-bit data and the data in the pattern RAMs 30a and 30b to be used for forming the pattern images and patch is FFh, then the data in the γ-tables at the highest address is changed so that the pattern images can be formed at an optimum image density.

The gate signals β524a and β524b are supplied to the gate circuits 37a and 37b via NAND gates 36a and 36b. In accordance with the input video signals β525a and β525b input to the laser drivers 38a and 38b, the laser drivers 38a and 38b change the duty ratio of ON/OFF to perform PWM modulation and turn on and off the semiconductor lasers 39a and 39b to form latent images on the photosensitive drums 2 to 5 by using the optical scan system including the polygon scanner and reflection mirrors.

In this embodiment, as described earlier, the laser drivers of the two-beam laser scan structure are used. Therefore, two systems for forming image data and patch data are used to drive the semiconductor lasers.

In this embodiment, under control of CPU 52c, the enable signals for the main and sub-scanning are controlled via the video controller bus β503 to thereby control the write position of each registration correction pattern image. For the write position control of usual image data, the video data address generation signal to be generated by the video memory controller 52d is controlled under CPU 52c via the video memory controller bus β504 in accordance with the BD signal β528 and ITOP signal β529 so that the timing of reading video data from the video memory 52b via the video memory control bus β509 can be controlled.

Image data of four colors supplied from the external video data bus β501b via the external interface 53a is stored beforehand in the video memory 52b. The external interface 53a is controlled by the interface controller 53b which is controlled by CPU 52c via the interface bus β501a, so that data write into the video memory 52b is controlled by the control bus β510.

The video data stored in the video memory 52b is read at the timings allowing images of respective colors to be superposed correctly, in accordance with the color shift correction amounts calculated as described previously. The image is therefore formed precisely on a transfer sheet.

In this embodiment, although the pattern generation circuit is provided for each color, the pattern RAMs 30a and 30b and the like may be used in common for all colors.

Figure 8:
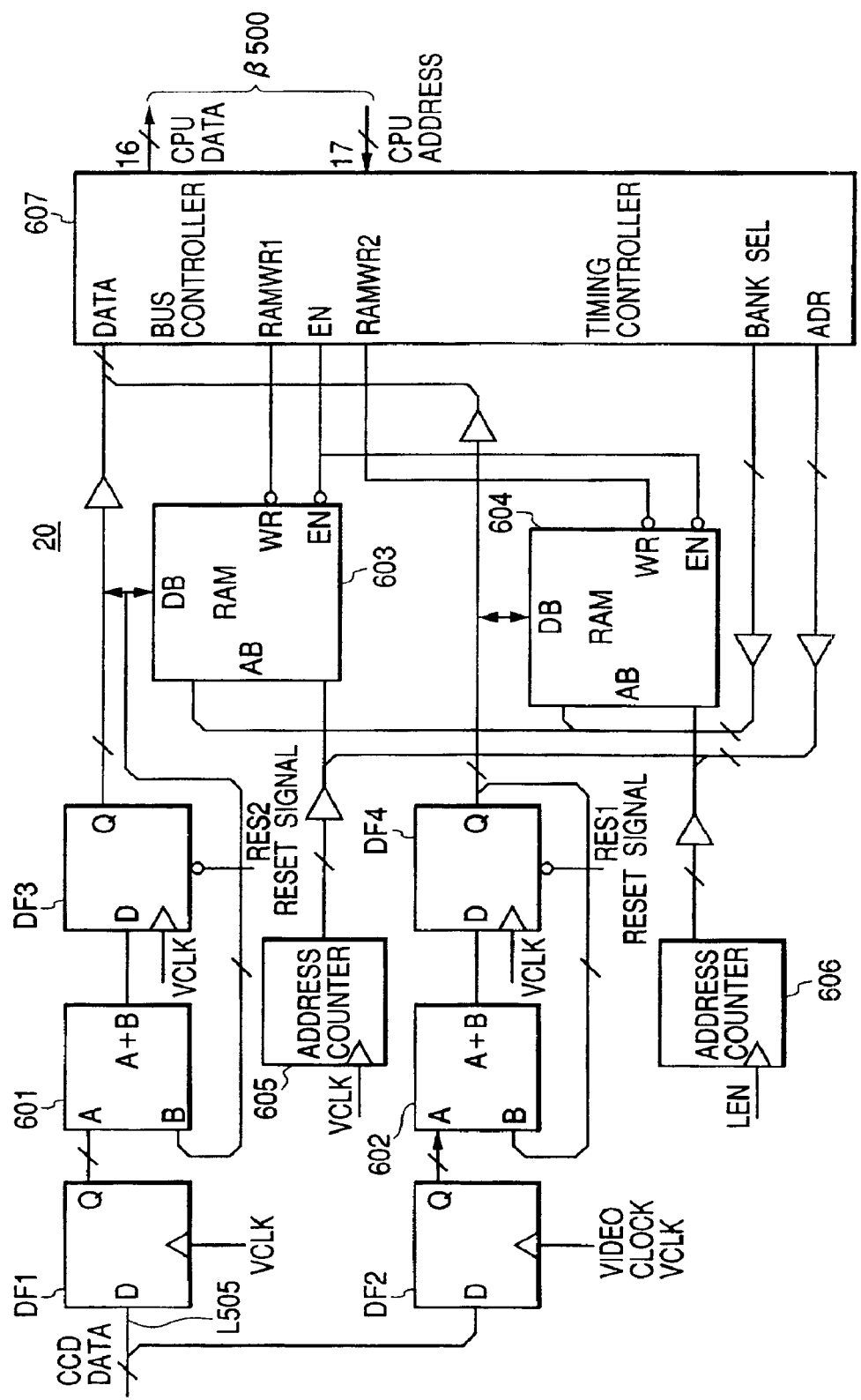
FIG. 8 is a diagram showing the main structure of a registration controller shown in FIG. 6.
Figure 9:
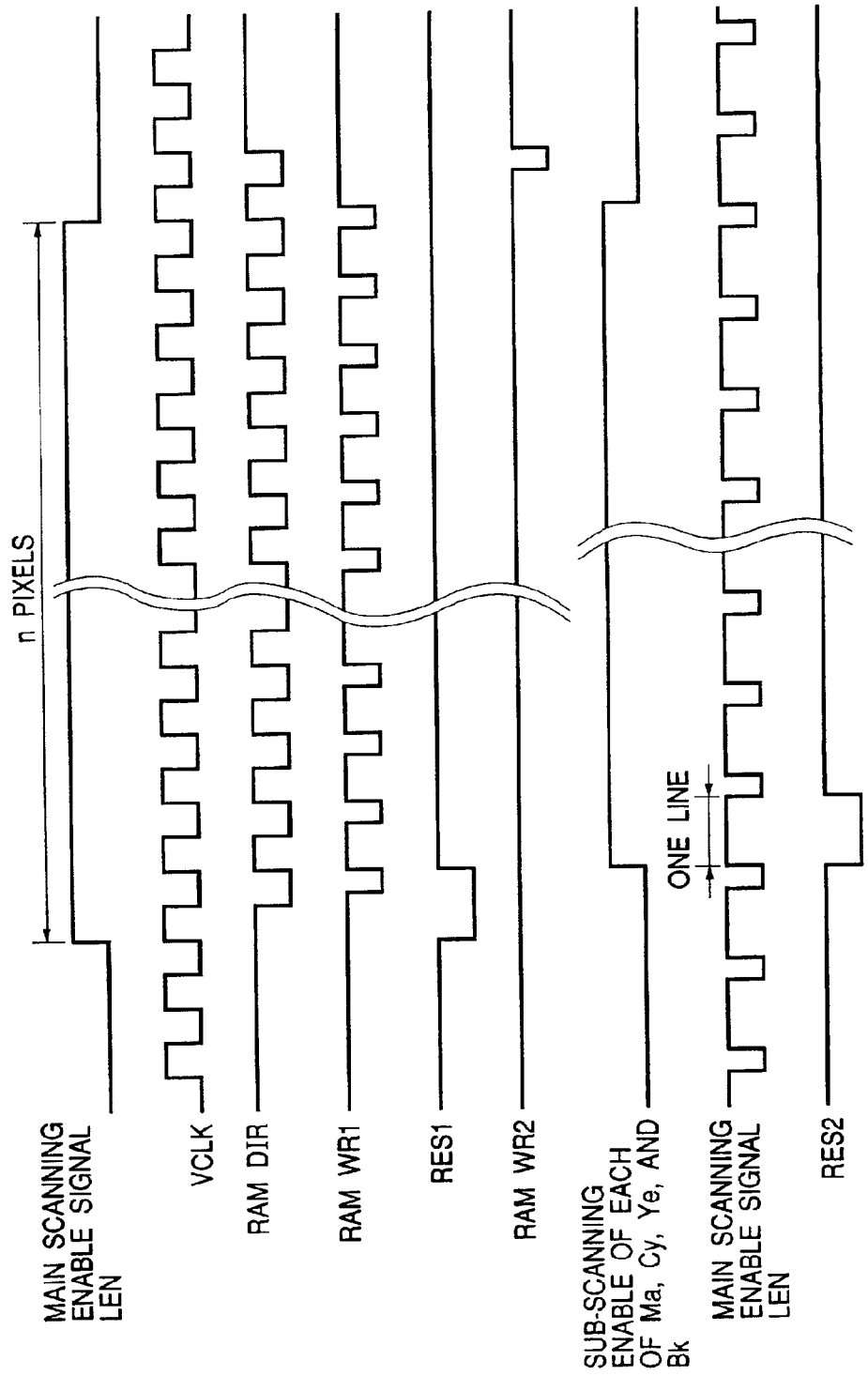
FIG. 9 is a timing chart illustrating the operation timings of the registration controller shown in FIG. 8.
Figure 10:
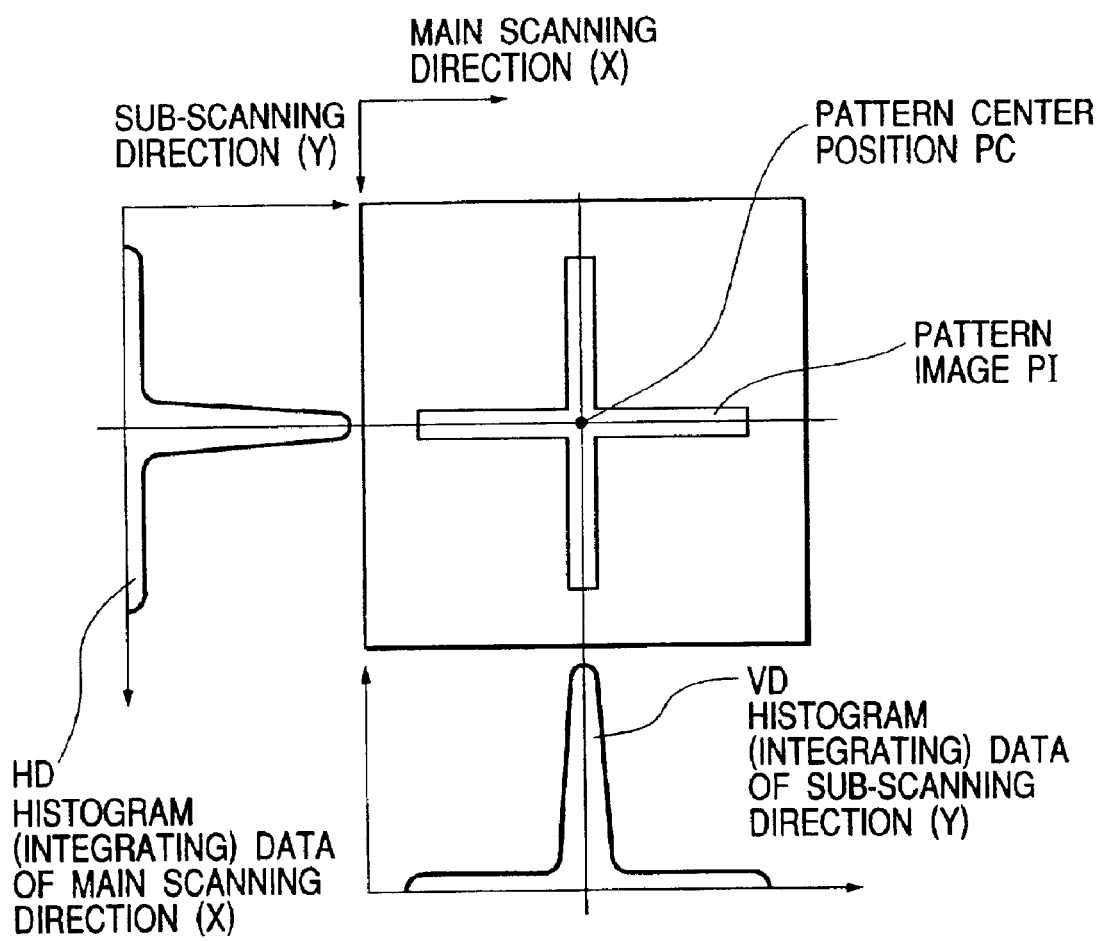
FIG. 10 is a histogram of an image on the transfer belt shown in FIG. 1.

With reference to FIGS. 8 to 10, a process of calculating the position and shape of a pattern image of each color will be described.

FIG. 8 is a block diagram showing the structure of the registration controller 20 shown in FIG. 6.

Referring to FIG. 6, D-type flip-flops DF1 and DF2 receive pattern data of one sub-scanning line output from the CCD sensors 10a and 10b via a line L505, and output the pattern data to adders 601 and 602 synchronously with VCLK. The adders 601 and 602 add the CCD data supplied from the flip-flops DF1 and DF2 to DB outputs from RAMS 603 and 604 to be described later. This data of one line is supplied to D-type flip-flops DF3 and DF4.

A bus/timing controller 607 transfers CPU data 16, CPU addresses 17 and the like to and from CPU 52c via the CPU bus β500, and outputs various timing signals such as RAMWR1, RAMWR2 and EN, a bank select signal BANK-SEL and an address signal ADR.

In accordance with a main scanning enable signal LEN output at a timing shown in FIG. 9 to be described later, the flip-flops DF3 and DF4 write the data of one line in RAMs 603 and 604 at the addresses determined by address counters 605 and 606, synchronously with the write signals RAMWR1 and RAMWR2.

The memories are enabled while the sub-scanning enable signal is output.

In this embodiment, the pattern recognition is performed in accordance with the accumulated pattern data of pixels of one line, which data is read in order to calculate the position and shape of the pattern image of each color in the main and sub-scanning directions.

FIG. 9 is a timing chart illustrating the operation of the pattern recognition process to be executed by the registration controller 20 shown in FIG. 8.

FIG. 10 is a histogram obtained from a pattern image transferred to the transfer belt 1 shown in FIG. 1.

The pattern recognition process to be executed by the registration controller shown in FIG. 8 will be described.

The accumulated data of the sub-scanning direction is formed as in the following. Pattern data of one sub-scanning line output from, e.g., the CCD sensor 10a, is initialized in response to a reset signal RES1. Thereafter, data of one line is obtained through addition by the adder 602. In response to the main scanning enable signal LEN output at the timing shown in FIG. 9, the data of one line is written in RAM 604 at the address determined by the address counter 606, synchronously with the write signal RAMWR2. The memories are enabled while the sub-scanning enable signal is output.

The accumulated data of the main scanning direction is formed as in the following. Pattern data of one main scanning line is initialized in response to a reset signal RES2. In accordance with the write signal RAMWR1 and a data direction switching signal RAMDIR, a read-modify-write operation is repeated for each pixel. The accumulated data of each pixel of each main scanning line in the adder 601 is stored in RAM 603.

Therefore, as shown in FIG. 10, the accumulated data of each color in the main scanning and sub-scanning directions of a pattern image of each color is stored in RAMs 603 and 604. Two circuits for this pattern recognition process are provided in the registration controller 20 in correspondence to two CCD sensors 10a and 10b.

The memory space is used separately by setting each color bank and each set bank to the RAM upper addresses by using a bank select signal BANKSEL.

As described earlier, for the pattern image of each of yellow (Ye), magenta (Ma), cyan (Cy) and black (Bk)

(however, since the image of Bk is formed on the Ye patch, it has an inverse pattern of the pattern shown in FIG. 9), the accumulated data HD and VD both in the main and sub-scanning directions shown in FIG. 10 is stored in RAMs 603 and 604. In accordance with the accumulated data HD and VD stored in RAMs 603 and 604, the center of peak of the accumulated data is calculated by CPU 52c by accessing the RAMs 603 and 604.

The calculated center position in the main and sub-scanning directions of each color is made coincident with the center position of the pattern image of other colors. To this end, the write positions in the main and sub-scanning directions are controlled and at the same time, the positions of the reflection mirrors 1000Ma, 1000Cy, 1000Ye and 1000Bk are controlled by the mirror motor controller 21 which controls the mirror driver 22 to drive the magnification (variable optical path length) correction motors M1 to M4 and inclination (variable optical path) correction motors M5 to M8. The motors are controlled by CPU 52c via the bus β500.

With reference to the flow chart of FIG. 11, the details of the registration correction process of this invention will be given.

It is generally known that the infrared reflectivities of magenta (Ma), cyan (Cy), yellow (Ye) and black (Bk) toners are different because of the influence of coloring material components. The magnitudes of the reflectivities are defined by the relation of "Ma>Cy>Ye>Bk".

However, this relation cannot be defined definitely because the reflectivity difference is not so large and is influenced by coloring material components.

Although the reflectivity difference is not so larger, there is some difference. It is known that this difference adversely affects the read precision of a registration correction pattern. Namely, the reflectivity difference results in a difference of the read peak level and read pattern of each color, which generates an error of pattern position calculation so that there is a large possibility of a registration shift even after the registration correction.

In this embodiment, therefore, the image density of a registration pattern of each color is adjusted.

Figure 11:
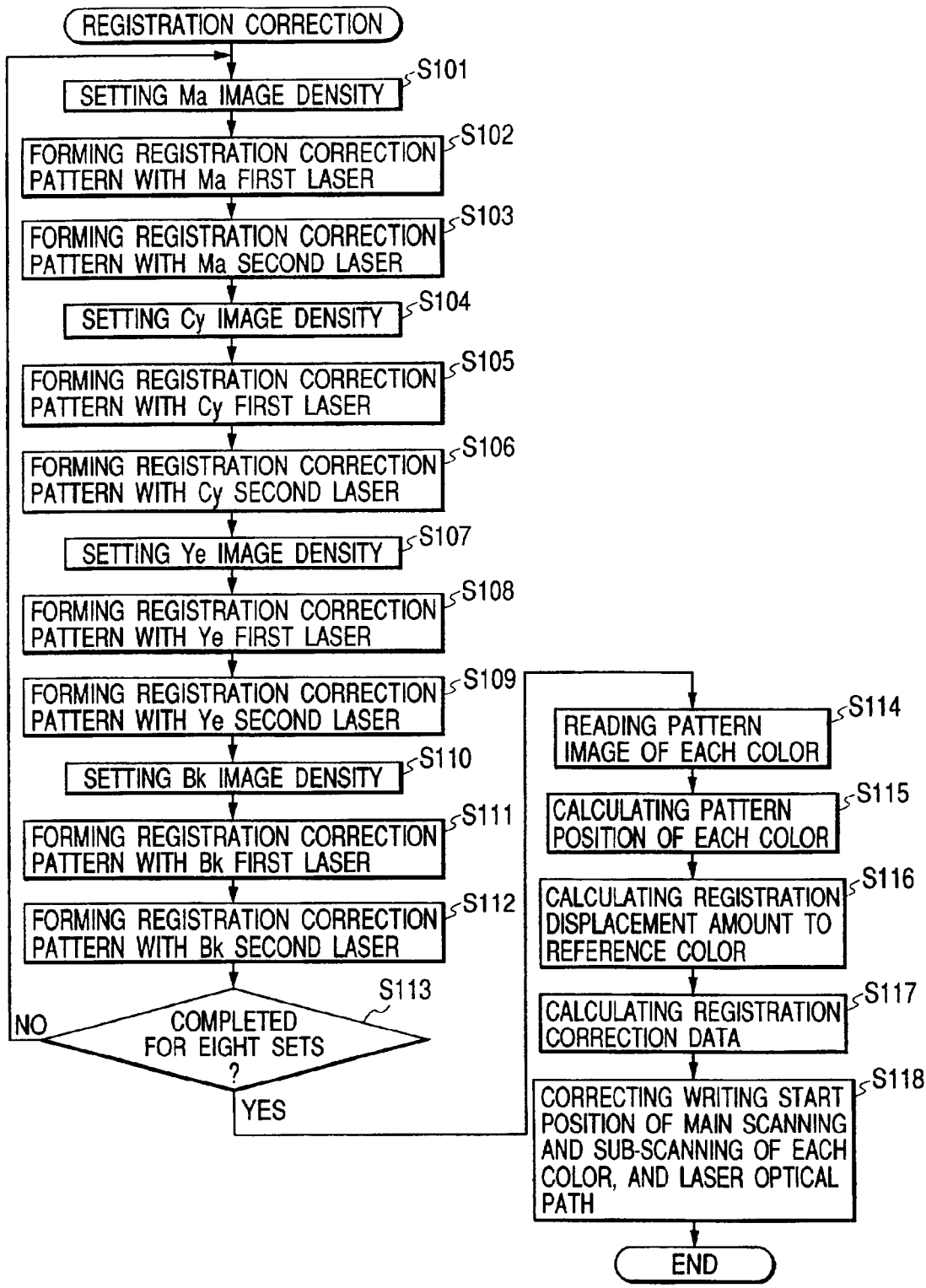
FIG. 11 is a flow chart illustrating a registration correction process to be executed by the image forming apparatus shown in FIG. 1.

FIG. 11 is a flow chart illustrating an example of a first control program to be executed by the image forming apparatus of this embodiment. The flow chart includes Steps S101 to S118.

First at Step S101, the magenta (Ma) image density is set. Specifically, the register 35 shown in FIG. 7 is used for rewriting the contents of the magenta tables of the γRAMs 34a and 34b. In this embodiment, the video data of 8-bit is used so that each of the γRAMs has 256 tables. The pattern data is stored at "FFh" so that the highest value in γRAM is rewritten. In accordance with the infrared reflectivities described above, the highest value in the magenta γ-table is rewritten as "A0h".

Next at Step S102, of the laser beams, two beams for each color, the first laser beam L1 among the laser beams L1 to L4 arranged in this order from the front side along the belt transport direction is made active, and the other laser beam L1' is set to an off-state or a state that a laser beam intensity is weak such as a bias turn-on state. Then, the magenta (Ma) registration correction patterns are formed on the transfer belt. The formed patterns are patterns such as shown in FIG. 4. Next, at Step S103, contrary to Step S102, the laser beam L1' is made active and the laser beam L1 is set to an off-state or a state that a laser beam intensity is weak such as a bias turn-on state. Then, the magenta (Ma) registration correction patterns for the second laser beam are formed on the transfer belt.

Similar to forming the magenta (Ma) patterns at Steps S101 to S103, cyan (Cy) patterns are formed at Steps S104 to S106, yellow (Ye) patterns are formed at Steps S107 to S109 and black (Bk) patterns are formed at Steps S110 to S112, respectively on the transfer belt 1.

In setting the image density of each color, the cyan (Cy) image density is set to "C0h", and the yellow (Ye) image density is set to "F0h". Since the carbon black is used as the black (Bk) toner, the pattern image is formed on the yellow (Ye) patch. Therefore, the black image density is set to "FFh" as having the largest infrared absorption value.

More specifically, at Step S104, the cyan (Cy) image density is set. The register 35 shown in FIG. 7 is used for rewriting the contents of the cyan tables of the γRAMs 34a and 34b to "C0h".

Next at Step S105, the first laser beam L2 is made active, and the other laser beam L2' is set to an off-state or a state that a laser beam intensity is weak such as a bias turn-on state. Then, the cyan (Cy) registration correction patterns are formed on the transfer belt 1. The formed patterns are patterns such as shown in FIG. 4. Next, at Step S106, contrary to Step S105, the laser beam L2' is made active and the laser beam L2 is set to an off-state or a state that a laser beam intensity is weak such as a bias turn-on state. Then, the cyan (Cy) registration correction patterns for the second laser beam are formed on the transfer belt 1.

Next, at Step S107, the yellow (Ye) image density is set. The register 35 shown in FIG. 7 is used for rewriting the contents of the yellow tables of the γRAMs 34a and 34b to "F0h".

Next at Step S108, the first laser beam L3 is made active, and the other laser beam L3' is set to an off-state or a state that a laser beam intensity is weak such as a bias turn-on state. Then, the yellow (Ye) registration correction patterns are formed on the transfer belt 1. The formed patterns are patterns such as shown in FIG. 4. Next, at Step S109, contrary to Step S108, the laser beam L3' is made active and the laser beam L3 is set to an off-state or a state that a laser beam intensity is weak such as a bias turn-on state. Then, the yellow (Ye) registration correction patterns for the second laser beam are formed on the transfer belt 1.

Next, at Step S110, the black (Bk) image density is set. The register 35 shown in FIG. 7 is used for rewriting the contents of the yellow tables of the γRAMs 34a and 34b to "FFh".

Next at Step S111, the first laser beam L4 is made active, and the other laser beam L4' is set to an off-state or a state that a laser beam intensity is weak such as a bias turn-on state. Then, the black (Bk) registration correction patterns are formed on the transfer belt 1. The formed patterns are patterns such as shown in FIG. 4. Next, at Step S112, contrary to Step S111, the laser beam L4' is made active and the laser beam L4 is set to an off-state or a state that a laser beam intensity is weak such as a bias turn-on state. Then, the black (Bk) registration correction patterns for the second laser beam are formed on the transfer belt 1.

In the above-described manner, the registration correction pattern forming operation is repeated eight times to form eight registration correction patterns by the first laser beams and eight registration correction patterns by the second laser beams on the transfer belt 1, totalling in sixteen patterns (i.e., eight sets). A plurality of registration correction patterns are formed in order to suppress a correction miss to be caused by defective pattern formation and improve the registration correction level.

Next, it is checked at Step S113 whether eight sets have been completed. If completed, at Step S114 the registration correction patterns of 8×2 formed on the transfer belt are sequentially read to form histogram data which is stored in RAMS 603 and 604 of the registration controller 20.

Next at Step S115, the position data of each color registration pattern is calculated. CPU 52c accesses the registration correction pattern image data stored in RAMS 603 and 604 and calculates the peak of the histogram data of each color in the main and sub-scanning directions to obtain the position of each color pattern. Since eight sets of pattern position data are obtained, an average of pattern position data is used as the final pattern position data.

Each color pattern is read along the belt transport direction at a constant timing corresponding to a twofold of the size of the registration pattern. Each color pattern is also formed at the same timing. Therefore, a shift of the center position of histogram data of each color corresponds to a relative shift amount of the registration pattern of each color.

At Step S116, relative to the reference color (in this embodiment, cyan (Cy)) of the first laser beam, a registration shift amount of each of other patterns formed by the first and second laser beams is calculated.

In this embodiment, position read precisions of each color in the main and sub-scanning directions are set to "256/256" steps. One step has a resolution of "18 μm" which corresponds to the precision of the registration pattern reading sensor. The belt transport direction is the sub-scanning direction, and the direction perpendicular to the transport direction is the main scanning direction.

It is assumed herein that the cyan (Cy) registration pattern formed by the first laser beam on the right side along the belt transport direction is at the position "128/128" in the main and sub-scanning directions and that on the left side is at the position "128/128". In this case, if the magenta (Mg) registration pattern formed by the first laser beam on the right side is at the position "136/120" and that on the left side is at the position "120/120", then it is concluded that the magnification of the magenta (Ma) pattern relative to the cyan (Cy) pattern formed by the first laser beams advances by 16 steps (288 μm) in the main scanning direction and that the pattern write position advances by 8 steps (144 μm) in the sub-scanning direction.

In accordance with the shift amount of each of the other colors relative to the cyan (Cy) registration pattern by the first laser beam calculated in the above manner, registration correction data of the registration patterns by the first and second laser beams other than the cyan (Cy) registration patterns by the first laser beam are calculated at Step S117.

In the above-described example, the registration correction data is used for adjusting the write position of the magenta (Mg) first laser beam relative to the cyan (Cy) first laser beam to effect a delay of "144 μm" in the sub-scanning direction and for adjusting the magnification of the reflection mirror 1000Ma of the laser scan optical system corresponding to "288 μm" by driving the magnification correction motor M1.

At Step S118, in accordance with the registration correction data calculated at Step S117, electrical correction for the write position of the registration pattern of each color and/or mechanical correction for the laser optical path, respectively in the main and sub-scanning directions, is executed.

In this example, since the inclination is not shifted, the inclination correction motor is not driven. However, if there is any shift of the inclination, the inclination correction is executed similar to the magnification correction.

The first and second laser beams of each color are applied to the photosensitive drum via the common optical system.

Therefore, for example, after the magnification of the magenta (Ma) first laser beam is adjusted, the magnification of the second laser beam is not necessary. Namely, after the registration correction (optical path correction and write position correction for inclination/magnification adjustment) by the first laser beams of the colors other than the first laser beam of cyan (Cy), only the write position adjustment by the second laser beams of the other colors Ma, Cy, Ye and Bk is executed for the registration correction.

As described above, in the registration correction mode of this embodiment, the first and second laser beams of each color are adjusted at the same time, and the image density of each color is set independently for each color. The image registration correction can therefore be made at a good precision by radiating eight laser beams.

In the usual image forming mode, after the position shift of each color is corrected, the register 35 controls the γRAMs 34a and 34b to set the common density value for each color, without rewriting the γ-tables to set the predetermined density to each color.

Also in this embodiment, although the Cy first laser beam is used as the reference color, the other colors such as Ma, Ye and Bk of the first laser beam other than Cy, and Cy, Ma, Ye and Bk of the second laser beam, may also be used with similar expected advantages.

Alto in this embodiment, an image is formed by PWM modulating the laser beam with video signals. The power of the laser beam may also be modulated with similar expected advantages.

In this embodiment, the image density of magenta (Ma) is set to "A0h", the image density of cyan (Cy) is set to "C0h", the image density of yellow (Ye) is set to "F0h", and the image density of black (Bk) is set to "FFh". The image densities for magenta (Ma), cyan (Cy), yellow (Ye) and black (Bk) are not limited to the above values, but they may be determined beforehand in accordance with the reflectivities of coloring material components and stored beforehand in ROM or the like.

In this embodiment, although the registration correction mark is formed on the transfer belt, it may be formed on, for example, a recording sheet. If an apparatus is used which transfers an image on a recording sheet via an intermediate transfer member (belt/drum), the registration correction mark may be formed on the intermediate transfer member, with similar expected advantages.

As above, the image density of the registration correction mark formed by each image station is set independently for each color. Therefore, a difference of detection levels between registration correction patterns can be eliminated, which might be caused by a difference of image densities of the patterns formed by the image stations, i.e., a difference of developments, coloring material components and the like. Therefore, in accordance with the registration shift amount obtained by detecting each registration correction mark formed by each image station, the electrical correction for record image signals and/or mechanical correction for the optical path length and optical path by driving the reflection mirror disposed along the optical path of the laser beam can be executed at high precision.

In this embodiment, the image density of the registration correction pattern of each color is changed by changing the contents of the γ-table of each color in the position shift correction mode. The image density of the registration correction pattern may be changed by changing the power of each laser beam.

Figure 12:
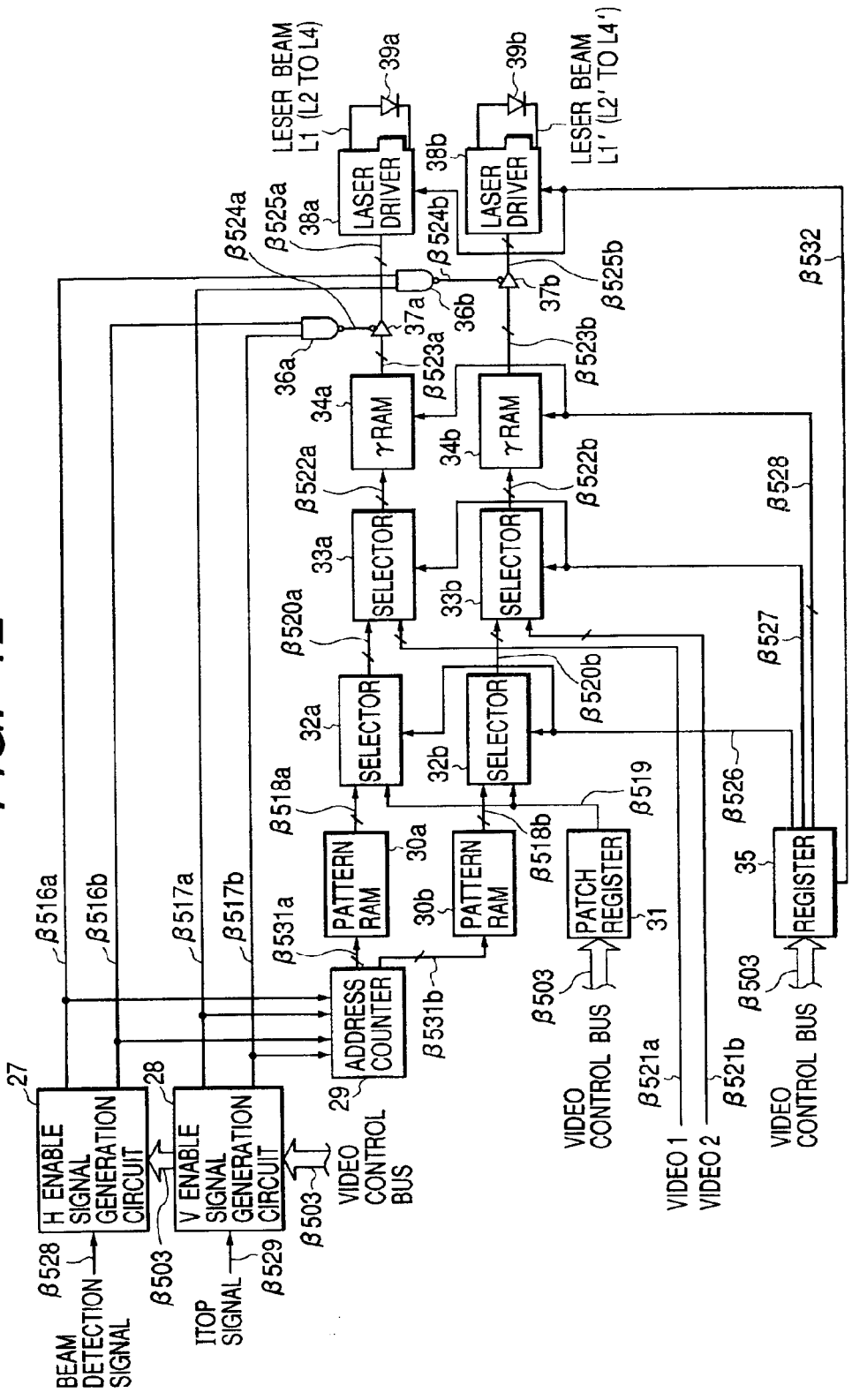
FIG. 12 is a diagram showing another example of the structure of the video controller in the image processing station shown in FIG. 1.

FIG. 12 is a block diagram showing the main structure of the video controller 52a of the image processing station 52 which changes the image density of the registration correction pattern by changing the power of each laser beam. In FIG. 12, similar constituent elements to those shown in FIG. 7 are represented by using identical reference numerals and the description thereof is omitted.

Also in the circuit shown in FIG. 12, in the position shift correction mode, i.e., in the mode of forming registration correction patterns and a patch, the pattern image and patch are selected by the selectors 32a and 32b in response to the select signal β527, the selected image data β522a and β522b are supplied to the γRAMs 34a and 34b, and the γ-transformed image data β523a and β523b is output to the laser drivers 38a and 38b via gate circuits 37a and 37b as the video signals β525a and β525b.

In this embodiment, the powers of laser beams driven by the laser drivers 38a and 38b can be changed by a control signal β532 supplied from the register 35. In the position shift correction mode, the powers of laser beams of each color are changed by the control signal β532 when the registration correction patterns are formed. It is therefore possible to change the image density of the registration correction pattern of each color.

FIG. 13 is a diagram showing the details of the laser drivers 38a and 38b.

In this embodiment, as described previously, in order to correct the position shift, registration patterns are formed on the transfer belt and the images of these registration correction patterns are read with the CCD sensors. Since the white/black CCD sensor is used, the registration correction pattern formed by color toner is read as an ND image. The read data has therefore a large level difference between colors.

When the registration correction pattern is read in the visual range, the color level of the transfer belt is also read. Therefore, the dynamic range of the read level of each registration pattern becomes small and the influence by external disturbance becomes very large. Even if the registration correction pattern is read in the infrared range, the read level of each color is difficult to be made equal because the toners in the infrared range have different reflectivities.

The registration correction pattern formed on the Ye patch is read for the color Bk. It is therefore necessary to increase the image densities of both Ye and Bk, to increase the infrared reflectivity of the Ye patch, and to increase the infrared absorption amount of the Bk pattern.

In this embodiment, separately from the usual image forming mode, only in the position shift correction mode, the power of each laser beam is controlled to control the image density of each registration correction pattern independently for each color.

A PWM generation circuit 381 shown in FIG. 13 generates a PWM signal in accordance with the video signals β525a and β525b output from the gate circuits 37a and 37b shown in FIG. 12 and video clocks β530a and β530b synchronizing with the video signals.

Specifically, the PWM generation circuit 381 generates a reference triangular wave shown in FIG. 14A in accordance with the video clock β530, and compares the reference triangular wave with the D/A converted video signal β525.

If the level of the video signal is large (near to FFh), the high level period of the PWM signal becomes long, and in the opposite case, the high level period becomes short. Therefore, the gradation of an image is controlled by controlling the turn-on period of a laser beam during one video clock period in accordance with the level of the video signal.

The image density can therefore be controlled by adjusting the laser beam turn-on period in accordance with the video signal level.

The level of the video signal may be controlled to adjust the image density of the registration correction pattern. However, if the image density of the registration correction pattern is changed by controlling the turn-on period of the laser beam, the area of each pixel in the registration correction pattern changes with the set image density, which may pose a problem in reading the registration correction image.

In order to solve this problem, in this embodiment, in the position shift correction mode, the resister 35 controls the γ-tables 34a and 34b to fix the level of an output video signal to "FFh". In addition, the laser control signal β532 output from the register 35 makes the illumination light amount of a laser beam variable to thereby control the image density of the registration correction pattern. As the laser light amount increases, the latent image on the photosensitive drum becomes deep so that the amount of developed toner increases and the thickness of a developed image becomes large without changing the width of the image. Namely, the toner amount per unit area increases and the reflection light amount increases.

More specifically, in the position shift correction mode, laser output setting values β531a and β531b set by the register 35 are converted by a D/A converter 382 into analog laser output setting values β532a and β532b. A laser drive unit 383 has a constant current source for driving the laser which is turned on and off by a PWM signal under a constant current. Only in the position shift correction mode, the set value of this constant current source is adjusted for each color to change the emission light amount of the laser.

In this embodiment, a laser chip of about 10 mW is used, and the constant current value is made adjustable in the range of 60 mA to 80 mA as shown in FIG. 14C.

In this embodiment, in accordance with the reflectivities of toners in the infrared range, the image densities are set so as to satisfy Bk>Ye>(≧)Cy>(≧)Ma. In the usual image forming mode, the laser emission amount is set equal for all colors, and only when registration correction patterns are formed the laser emission amount is changed for each color.

The reflectivity of each toner does not change greatly with time and temperature. Therefore, a predetermined laser output setting value corresponding to each reflectivity is read from the register 35 to set the image density. The color Bk has a largest difference of the reflectivity relative to the other colors. In this connection, a Bk registration correction pattern may be formed at a first image density, and the registration correction patterns of other three colors excepting Bk may be formed at a second image density.

In the embodiment shown in FIG. 12 to FIGS. 14A, 14B and 14C, in the position shift correction mode, the emission amount of a laser beam of each color is controlled to change the image density of each color when the registration correction patterns are formed. It is possible to make the reflection light amount of each color equal, to improve a read precision of the registration correction pattern, and to correct the position shift with a high precision.

The structure of data processing programs readable by the image forming apparatus of this invention will be described with reference to a memory map shown in FIG. 15.

FIG. 15 is a memory map of a storage medium storing various data processing programs readable by the image forming apparatus of this invention.

Although not shown in FIG. 15, other data may be stored in the storage medium. Such data includes management data for programs stored in the storage medium such as version information and programmer names, and data dependent on OS reading a program such as icons for discriminating programs.

Data used by each of various programs is also managed by the directory shown in FIG. 15. If programs and data to be installed are being compressed, a decompressing program and the like may also be stored.

A host computer running on an externally installed program may realize the functions of the embodiment illustrated in FIG. 11. In this case, the invention is applicable to the case wherein a data set including the program is supplied to an output apparatus by using a storage medium such as a CD-ROM, a flash memory and an floppy disc or an external storage medium via a network.

It is obvious that the objects of the invention can be achieved by supplying a storage medium storing software program codes realizing the functions of each embodiment described above to a system or an apparatus whose computer (CPU or MPU) reads and executes the program codes stored in the storage medium.

In this case, the software program codes themselves realize the novel functions of the invention. Therefore, the storage medium storing the program codes constitutes the present invention.

The storage medium for storing such program codes may be a floppy disk, a hard disk, an optical disk, a magnetooptical disk, a CD-ROM, a CD-R, a DVD-ROM, a magnetic tape, a nonvolatile memory card, a ROM, an EEPROM, a silicon disc or the like.

It is obvious that the scope of the invention contains not only the case wherein the functions of the embodiment are realized by a CPU reading and executing the program codes but also the case wherein the functions of the embodiment are realized by an OS (operating system) or the like running on a computer and executing a portion or the whole of actual processes in accordance with the program codes.

It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

The invention is also applicable to a system having a plurality of apparatuses or to a single apparatus. It is obvious that the invention is applicable to the case wherein the embodiment functions are realized by supplying programs to the system or apparatus. In this case, the system or apparatus can receive the advantageous effects of the invention by reading the storage medium storing the software programs realizing the embodiment functions.

The system or apparatus can receive the advantageous effects of the invention by downloading the software program codes realizing the embodiment functions from a database on a network by using a communication program and reading the software program codes.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming apparatus comprising:

a plurality of image forming each having an image carrier and forming an image on the image carrier;

mark detecting means for detecting a plurality of registration correction marks formed on a recording medium by the plurality of said image forming means;

correcting means for correcting a position difference between images formed by the plurality of said image forming means in accordance with a detection result by said mark detecting means; and controlling means for independently controlling an image forming operation of each of the plurality of said image forming means to cause image density settings of the plurality of registration correction marks to be formed by said plurality of image forming means to differ from each other so that each of the registration correction marks formed by the plurality of said image forming means has a different predetermined image density.

2. An apparatus according to claim 1, wherein each of the plurality of said image forming apparatus includes γ-converting means for γ-converting an input video signal in accordance with a γ-table and writing means for writing an image corresponding to the γ-converted video signal on the image carrier, and said controlling means independently changes the γ-table of each of the plurality of said image forming means.

3. An apparatus according to claim 2, wherein said controlling means sets a common value to the γ-table of each of the plurality of said image forming means in an usual image forming mode.

4. An apparatus according to claim 1, wherein each of the plurality of said image forming means includes writing means for writing an image by irradiating a laser beam to the image carrier, and said controlling means independently controls a light amount of the lazer beam to be irradiated by each of the plurality of said image forming means.

5. An apparatus according to claim 4, wherein said controlling means outputs video signals having a same signal level corresponding to each of the registration correction marks to the plurality of said image forming means respectively.

6. An apparatus according to claim 5, wherein said writing means includes PWM signal generating means for generating a PWM signal in accordance with the video signal, and generates the laser beam in accordance with the PWM signal.

7. An apparatus according to claim 1, wherein the apparatus has a usual image forming mode and a position shift correction mode, and said controlling means controls a density of an image to be formed by each of the plurality of said image forming means to have a common value.

8. An apparatus according to claim 1, wherein the recording medium includes a motion member which moves in order to transfer a image formed on the image carrier by each of the plurality of said image forming means at a transfer position.

9. An apparatus according to claim 1, wherein the recording medium includes a transfer belt which moves in order to transfer an image formed on the image carrier by each of the plurality of said image forming means to a transfer member at a transfer position.

10. An apparatus according to claim 1, wherein said mark detecting means includes illuminating means for irradiating infrared light to the recording medium and a sensor for detecting a reflection light of the infrared light from the registration correction mark on the recording medium.

11. An image forming apparatus comprising:

a plurality of image forming means each having an image carrier and forming an image of a different color on the image carrier;

mark detecting means for detecting a plurality of registration correction marks of different colors formed on a recording medium by the plurality of said image forming means;

correcting means for correcting a position difference between color images formed by the plurality of said image forming means in accordance with a detection result by said mark detecting means; and controlling means for independently controlling an image forming operation of each of the plurality of said image forming means so that the registration correction mark of a predetermined color is formed at a first predetermined density and the registration correction marks of colors different from the predetermined color are formed at a second predetermined density different from the first predetermined density.

12. An apparatus according to claim 11, wherein each of the plurality of said image forming apparatus includes γ-converting means for γ-converting an input video signal in accordance with a γ-table and writing means for writing an image corresponding to the γ-converted video signal on the image carrier, and said controlling means independently changes the γ-table of each of the plurality of said image forming means.

13. An apparatus according to claim 12, wherein said controlling means sets a common value to the γ-table of each of the plurality of said image forming means in an usual image forming mode.

14. An apparatus according to claim 11, wherein each of the plurality of said image forming means includes writing means for writing an image by irradiating a laser beam to the image carrier, and said controlling means independently controls a light amount of the laser beam to be irradiated by each of the plurality of said image forming means.

15. An apparatus according to claim 14, wherein said controlling means outputs video signals having a same signal level corresponding to each of the registration correction marks to the plurality of said image forming means respectively.

16. An apparatus according to claim 15, wherein said writing means includes PWM signal generating means for generating a PWM signal in accordance with the video signal, and generates the laser beam in accordance with the PWM signal.

17. An apparatus according to claim 11, wherein the apparatus has a usual image forming mode and a position shift correction mode, and said controlling means controls a density of an image to be formed by each of the plurality of said image forming means to have a common value.

18. An apparatus according to claim 11, wherein the recording medium includes a motion member which moves in order to transfer an image formed on the image carrier by each of the plurality of said image forming means at a transfer position.

19. An apparatus according to claim 11, wherein the recording medium includes a transfer belt which moves in order to transfer an image formed on the image carrier by each of the plurality of said image forming means to a transfer member at a transfer position.

20. An apparatus according to claim 11, wherein said mark detecting means includes illuminating means for irradiating infrared light to the recording medium and a sensor for detecting a reflection light of the infrared light from the registration correction mark on the recording medium.

* * * * *

UNITED STATES PATENT AND TRADEMARK OFFICE
CERTIFICATE OF CORRECTION

PATENT NO. : 6,930,786 B2
APPLICATION NO. : 09/726463
DATED : August 16, 2005
INVENTOR(S) : Tatsuhito Kataoka et al.

It is certified that error appears in the above-identified patent and that said Letters Patent is hereby corrected as shown below:

Column 8, line 63, delete "γγRAMs" and insert --γRAMs--

Column 13, line 44, delete "yRAMs" and insert --γRAMs--

Column 19, line 37, delete "lazer beam" and insert --laser beam--

Column 19, line 55, delete "a image" and insert --an image--

Signed and Sealed this

Fifth Day of December, 2006

JON W. DUDAS
*Director of the United States Patent and Trademark Office*